US009806795B2

United States Patent
Chen

(10) Patent No.: US 9,806,795 B2
(45) Date of Patent: Oct. 31, 2017

(54) AUTOMATED EARPIECE CACHE MANAGEMENT

(71) Applicant: Christina Summer Chen, Bellevue, WA (US)

(72) Inventor: Christina Summer Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 705 days.

(21) Appl. No.: 13/959,155

(22) Filed: Aug. 5, 2013

(65) Prior Publication Data

US 2015/0039369 A1    Feb. 5, 2015

(51) Int. Cl.

| | | |
|---|---|---|
| *G06F 17/00* | (2006.01) |
| *H04B 7/26* | (2006.01) |
| *G06Q 10/10* | (2012.01) |
| *G10L 21/06* | (2013.01) |
| *H04M 1/05* | (2006.01) |
| *H04M 1/60* | (2006.01) |
| *G06F 3/16* | (2006.01) |

(52) U.S. Cl.
CPC .............. *H04B 7/26* (2013.01); *G06F 3/165* (2013.01); *G06Q 10/1095* (2013.01); *G10L 21/06* (2013.01); *H04M 1/05* (2013.01); *H04M 1/6066* (2013.01)

(58) Field of Classification Search
CPC ..... G06F 3/165; G06Q 10/1095; G10L 21/06; H04B 7/26; H04M 1/05; H04M 1/6066
See application file for complete search history.

(56) References Cited

U.S. PATENT DOCUMENTS

| | | |
|---|---|---|
| 7,212,944 B1 | 5/2007 | Kohler et |
| 7,627,289 B2 | 12/2009 | Huddart |
| 7,991,356 B2 | 8/2011 | Batey, Jr. et al. |

(Continued)

FOREIGN PATENT DOCUMENTS

EP      1349420 A2      10/2003

OTHER PUBLICATIONS

"Miisport Stereo Bluetooth Headset W/Built-in mp3 Player", Retrieved on: May 22, 2013, Available at: http://www.greenplanetcollections.com/miisport-stereo-bluetooth-headset-w-built-in-mp3-player-black/.

(Continued)

*Primary Examiner* — Joseph Saunders, Jr.
(74) *Attorney, Agent, or Firm* — Perkins Coie LLP

(57) ABSTRACT

Many types of earpiece include a memory to which media items stored on a second device, such as music, audiobooks, and podcasts, may be transferred as requested by a user. However, it may be advantageous to configure the earpiece and/or the to fill the memory automatically with media items of predicted interest to the user in the manner of a cache. In such earpieces, interruption of the connection between the earpiece and the second device does not interrupt a currently streaming media item, and the earpiece is capable of playing additional media items of predicted interest to the user even if the user has not requested transfer to the earpiece. Other uses of the cache include adding appointments from a calendar of the second device for presentation by the earpiece as reminders during disconnection, and storing notes on the earpiece that are automatically transferred back to the second device.

16 Claims, 9 Drawing Sheets

(56) References Cited

U.S. PATENT DOCUMENTS

| | | | |
|---|---|---|---|
| 8,155,336 B2 | 4/2012 | Tang | |
| 2002/0040255 A1 | 4/2002 | Neoh | |
| 2003/0182003 A1* | 9/2003 | Takashima | H04R 1/1091 700/94 |
| 2007/0177558 A1* | 8/2007 | Ayachitula | H04W 28/18 370/338 |
| 2008/0119239 A1* | 5/2008 | Mabuchi | H04M 1/6066 455/569.1 |
| 2008/0132293 A1 | 6/2008 | Gundlach et al. | |
| 2008/0151817 A1* | 6/2008 | Fitchett | H04W 28/20 370/329 |
| 2008/0194209 A1* | 8/2008 | Haupt | H04H 20/63 455/73 |
| 2009/0327941 A1* | 12/2009 | Fong | G06F 3/048 715/765 |
| 2012/0213381 A1 | 8/2012 | Pelland et al. | |
| 2013/0021373 A1 | 1/2013 | Vaught et al. | |
| 2013/0022220 A1 | 1/2013 | Dong et al. | |
| 2013/0278492 A1* | 10/2013 | Stolarz | G06F 3/01 345/156 |

OTHER PUBLICATIONS

"Bluetooth Stereo Clip Headset with Built-in FM Radio and OLED Display", Published on: Oct. 2, 2009, Available at: http://shop.brando.com/bluetooth-stereo-clip-headset-with-built-in-fm-radio-and-oled-display_p03789c0201d033.html.

"Smart Wireless Headset Pro", Published on: Apr. 21, 2012, Available at: http://store.sony.com/webapp/wcs/stores/servlet/ProductDisplay?catalogId=10551&storeId=10151&langId=-1&productId=8198552921666417432.

"Plantronics Voyager Legend Bluetooth Headset—Retail Packaging—Black", Published on: Apr. 30, 2013, Available at: http://www.amazon.com/Plantronics-Voyager-Legend-Bluetooth-Headset/dp/B0092KJ9BU/ref=sr_1_1?s=electronics&ie=UTF8&qid=1366657277&sr=1-1&keywords=plantronics+voyager+legend.

International Search Report and Written Opinion for PCT Patent Application No. PCT/US2014/049324 dated Jan. 30, 2015, 24 pages.

iPhone User Guide Contents for iDS 4.2 and 4.3 Software, Published Mar. 9, 2011, http://manuals.info.apple.com/MANUALS/1000/MA1539/en_US/iPhone_iOS4_User_Guide.pdf.

"Acoustic Chase: Designing an interactive audio environment to stimulate human body movement", Simon Karl Josef Schiessl, Jun. 2004, In Doctoral Dissertation—Massachusetts Institute of Technology, School of Architecture and Planning, Program in Media Arts and Sciences, reprinted from the Internet at: http://pubs.media.mit.edu/pubs/papers/Schiessl.pdf, 60 pgs.

"Head Tracking for Using a GPS-Aided 3D Audio MEMS IMU", Joffrion and J.F. Raquet, Feb. 2006, In Technical Report—AFRL-HE-WP-JA-2006-0002, reprinted from the Internet at: http://www.dtic.mil/dtic/tr/fulltext/u2/a444265.pdf, 12 pgs.

"Large-Scale Mobile Audio Environments for Collaborative Musical Interaction", Mike Wozniewski, Nicolas Bouillot, Zack Settel and Jeremy R. Cooperstock, Jun. 2008, International Conference on New Interfaces for Musical Expression, reprinted from the Internet at: http://srl.mcgill.ca/publications/2008-NIME-Wozniewski.pdf, 6 pgs.

"Wearable Navigation System for the Visually Impaired and Blind People", Esteban Bayro Kaiser and Michael Lawo, May 30, 2012, IEEE/ACIS 11th International Conference on Computer and Information Science, reprinted from the Internet at: http://ieeexplore.ieee.org/xpl/login.jsp?tp=&arnumber=6211819&url=http%3A%2F%2Fieeexplore.ieee.org%2Fxpls%2Fabs_all.jsp%3Farnumber%3D6211819, pp. 230-233.

"Scosche Stereo Headphones with Tapline Music Control and Microphone for Apple iPod/iPhone", Nov. 1, 2010, reprinted from the Internet at: http://www.amazon.com/Scosche-Headphones-Tapline-Control-Microphone/dp/B003Fo0J4K, 4 pgs.

"Planatronics Voyager Legend Bluetooth Headset—Retail Packaging—Black", May 27, 2013, reprinted from the Internet at: http://www.amazon.com/Plantronics-Voyager-Legend-Bluetooth-Headset/dp/B0092KJ9BU/ref=sr_1_1?s=electronics&ie=UTF8&qid=0366657277&sr=1-1&keywords=plantronicsw+voyager+legend, 7 pgs.

"Streamer Pro: One Device, Many Features", May 28, 2013, reprinted from the Internet at: http://www.oticonusa.com/product-showcase/connectivity/streamer%20pro/overview.aspx, 1 pg.

International Preliminary Report on Patentability Issued in PCT Application No. PCT/US2014/049324, mailed: Jul. 31, 2015, 7 Pages.

Sony, "Smart Wireless Headset pro Bedienungsanleitung Inhaltsverzeichnis", Published on: Dec. 31, 2011, Available At: http://www-support-downloads.sonymobile.com/mw1/userguide_DE_MW1_1250-7857.1.pdf.

* cited by examiner

AUTOMATED EARPIECE CACHE MANAGEMENT

BACKGROUND

Within the field of computing, many scenarios involve an earpiece device that produces audio for a user. Some earpieces also feature memory for storing audio, such as music, podcasts, and audiobooks, stored on a second device. The user may request to transfer some media items to the earpiece, and the earpiece may present the media items at the request of the user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While the configuration of an earpiece to receive, store in memory, and play media items selected by a user may be advantageous, it may be further advantageous to automatically fill the memory with media items that are of predicted interest to the user. As a first example, the user may be currently listening to a media item that is streamed from a second device while connected to the earpiece, but during an interruption of the connection, the playing of the media item may be interrupted. Instead, it may be desirable to cache the entire current media item in the cache of the earpiece, such that interruption of the connection with the second device does not interrupt the presentation of the media item by the earpiece. As a second example, some media items may be of predicted interest to the user (e.g., other media items may represent the chapters in an audiobook following the currently playing chapter, or other music recordings may represent other tracks in an album including a currently playing music recording), and the cache of the earpiece may be automatically filled with the other media items of interest, optionally with enough content to fulfill a battery duration or predicted disconnection period of the earpiece. In this manner, the contents of the cache of the earpiece may be automatically filled with media item content in anticipation of a planned or unplanned interruption of the connection with the second device in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
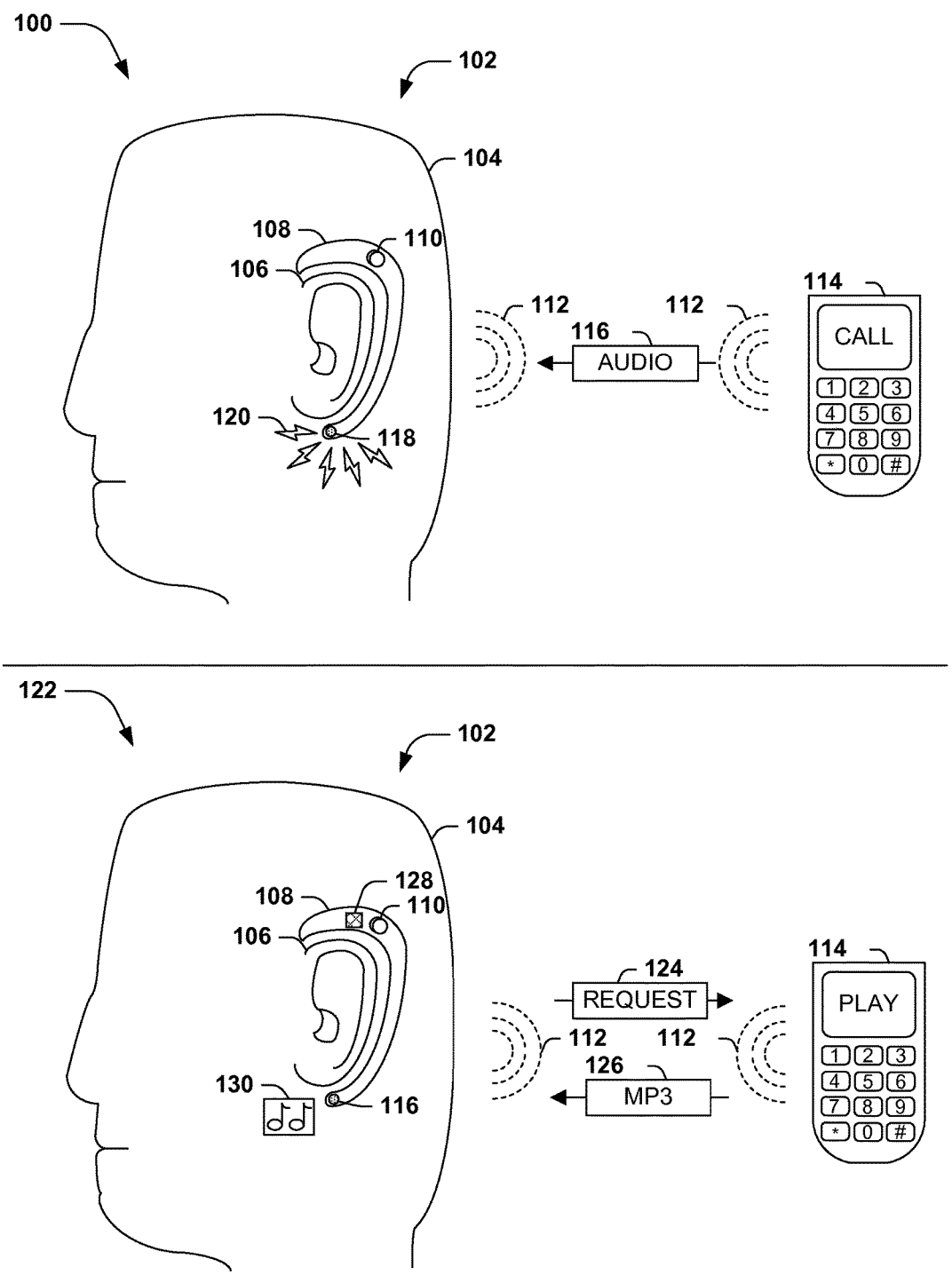
FIG. 1 is an illustration of an exemplary scenario featuring an example earpiece device featuring a memory for storing media items.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 presents an illustration of an exemplary scenario featuring an earpiece 108 worn on an ear 106 of a head 104 of a user 102. The earpiece 108 features a battery 110, and maintains a wireless connection 112 with a second device 114 presenting audio output 116 to the user 102, such as a recording of music, books, and podcasts. At a first time 100, upon receiving a request of the user 102, the audio output 116 may be streamed from the second device 114 to the earpiece 108 for concurrent playback as audio output 120 from a speaker 118 integrated with the earpiece 108. Additionally, at a second time 122, at the request 124 of the user 102, one or more media items 126 may be transferred over the wireless connection 112 to a memory 128 of the earpiece 108, and may be stored in the memory 128, such that a second request 124 by the user 102 to initiate playback of the media item 126 on the earpiece 108 may be fulfilled using the memory 128 (e.g., playing music 130 at the request of the user 102 through the speaker 116 of the earpiece 108), even during an interruption of the wireless connection 112 with the second device.

B. Presented Techniques

While the exemplary scenario of FIG. 1 illustrates some advantageous configurations of earpieces 108, it may be appreciated that some disadvantages may arise within such scenarios. As a first example, an interruption of the wireless connection 112 during streamed audio output 116 may result in an interruption of the presentation of the streamed audio output 116. In some scenarios, such interruption may be difficult to avoid (e.g., where the audio output 116 comprises a realtime audio communication session, such as a live phone call); but in other scenarios, where the streamed audio 116 is available beyond the currently playing moment (e.g., prerecorded music or a podcast), the interruption may be mitigated using the memory 128 of the earpiece 108. As a second example, filling the memory 128 of the earpiece 108 with media items 126 at request 124 of the user 102 may be frustrating for a user 102 who simply wishes the earpiece 108 to continuously contain new media items 126; e.g., the user 102 may not wish to manage the memory 128 of the earpiece 108, but may like the memory 128 to be automatically filled with media items 126 of interest to the user 102. As a third example, an interruption of the wireless connection 112 with the second device 114 may not be predicted, such as an unanticipated loss of connectivity or a dead battery of the second device 114, and the user 102 may not have acted to transfer media items 126 to the memory 128 of the earpiece 108.

In view of these potential disadvantages, the present disclosure provides techniques for automatically filling a memory 128 of an earpiece 108 in the manner of a cache, i.e., with media items 126 that are of predicted interest to the user 102.

Figure 2:
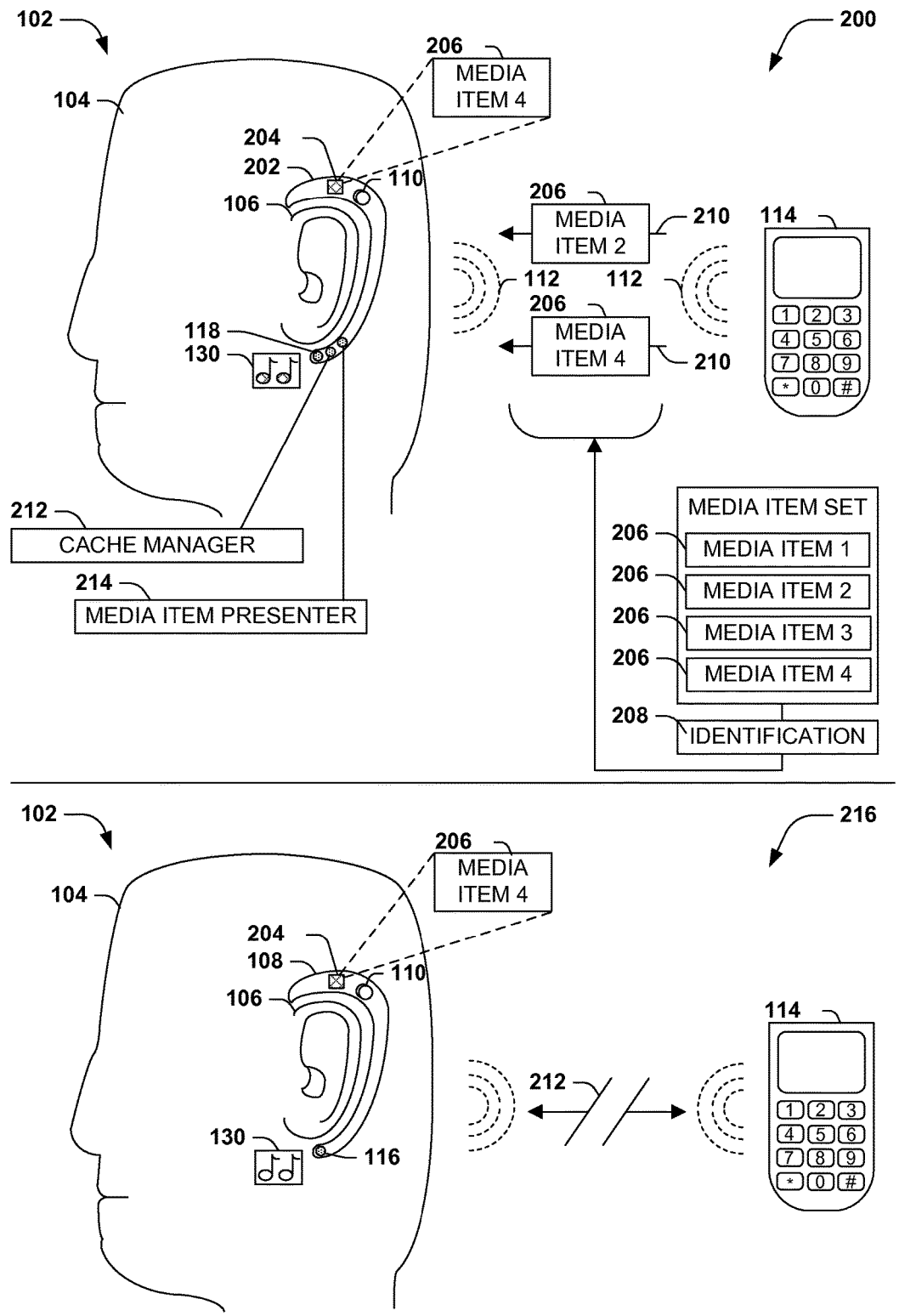
FIG. 2 is an illustration of an exemplary scenario featuring an example earpiece device featuring a cache that is automatically filled with media items in accordance with the techniques presented herein.

FIG. 2 presents an illustration of an exemplary scenario featuring an earpiece 202 configured in accordance with the techniques presented herein, wherein the earpiece 202 is worn on an ear 106 of a head 104 of a user 102 who also operates a second device 114. In this example, at a first time 200, while the earpiece 202 maintains a wireless connection 112 with the second device 114, a cache manager 212 may perform an identification 208, among a media item set of media items 206 stored on the second device 114. The identification 208 may result in the transfer 210 of media items 206 to a cache 204 of the earpiece 202. The earpiece 202 may fulfill requests of the user 102 to play the media items 206, e.g., as audio output such as music 130 transmitted to the ear 106 of the user 102 through a speaker 118. At a second time point 216, during an interruption 212 of the wireless connection 112 between the earpiece 202 and the second device 114, a media item presenter 214 the earpiece 202 may continue playing media items 206 stored in the cache 204 of the earpiece 202, thereby avoiding an interruption of streamed media items and/or a presentation of media items 206 of predicted interest to the user 102. The media item presenter 214 may also accept and fulfill requests by the user 102 to play one or more of the media items 206 stored in the cache 204. Notably, this streaming and fulfillment of requests to play media items 206 is achieved in the absence of an affirmative request 124 by the user 102 to transfer the media items 206 to the cache 204 of the earpiece 202 in accordance with the techniques presented herein.

C. Exemplary Embodiments

FIG. 2 presents a first exemplary embodiment of the techniques presented herein, illustrated as an exemplary earpiece 202 wearable by a user 102 and usable with a second device 114 of the user 102. The exemplary earpiece 202 comprises a cache 204 and a speaker 118. The exemplary earpiece 202 further comprises a cache manager 214 that identifies 208, among at least two media items 206 on the second device 114, at least one selected media item 206 that is of predicted interest to the user 102, and transfers the at least one selected media item 206 from the second device 114 to the cache 204 of the earpiece 108. The exemplary earpiece 202 further comprises a media item presenter 214 that presents to the user 102, through the speaker 118, the at least one selected media item 206 from the cache 204 during an interruption of the wireless connection 112 with the second device 114. In this manner, the exemplary earpiece 202 achieves the presentation to the user 102 of the media items 206 stored on the second device 114 in accordance with the techniques presented herein.

Figure 3:
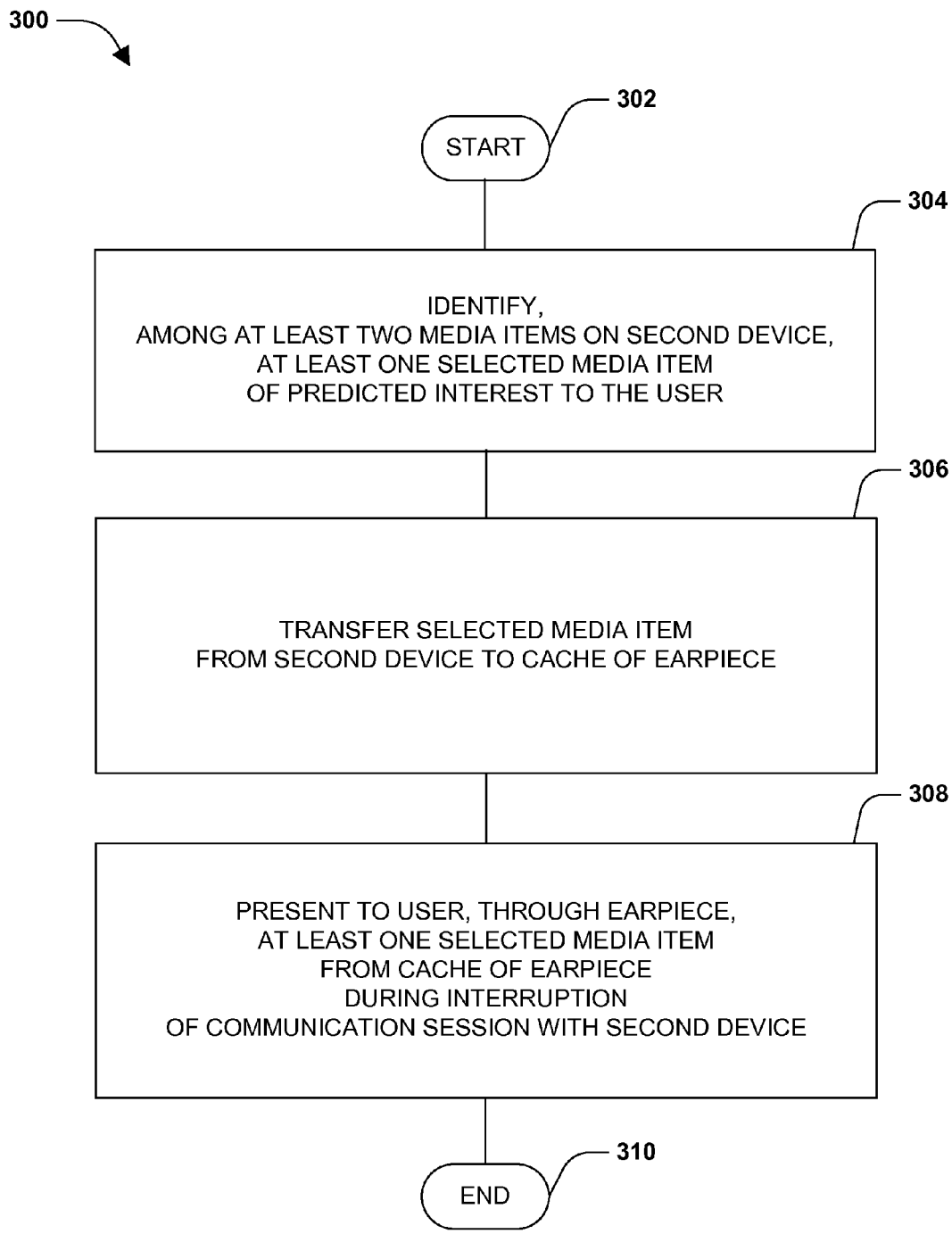
FIG. 3 is a flow diagram of an exemplary method of configuring an earpiece to communicate with a second device in accordance with the techniques presented herein.

FIG. 3 presents an illustration of a second exemplary embodiment of the techniques presented herein, illustrated as an exemplary method 300 of configuring an earpiece 202 worn by a user 102 and having a communication session with a second device 114 of the user 102, to manage a cache 204 of the earpiece 202. The exemplary method 300 may be implemented, e.g., as a set of instructions stored in a memory component of the earpiece 202, such as a memory circuit, a platter of a hard disk drive, a solid-state storage device, or a magnetic or optical disc, and organized such that, when executed on a processor of the earpiece 202, cause the earpiece 202 to operate according to the techniques presented herein. The exemplary method 300 begins at 302 and involves identifying 304, among at least two media items 206 stored on the second device 114, at least one selected media item 206 that is of predicted interest to the user 102. The exemplary method 300 also involves transferring 306 the at least one selected media item 206 from the second device 114 to the cache 204 of the earpiece 202. The exemplary method 300 also involves presenting 308 to the user 102, through the speaker 118 of the earpiece 202, the at least one selected media item 206 from the cache 204 of the earpiece 202 during an interruption of the communication session with the second device 114. In this manner, the instructions of the exemplary method 300 of FIG. 3 enable the presentation of media items 206 to the user 102 of the earpiece 202 during an interruption of the communication session with the second device 114, and in the absence of an explicit request by the user 102 to transfer the media items 206 to the cache 204 of the earpiece 202, in accordance with the techniques presented herein, and so ends at 310.

Still another embodiment involves a computer-readable medium comprising processor-executable instructions configured to apply the techniques presented herein. Such computer-readable media may include, e.g., computer-readable storage devices involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage devices) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 4:
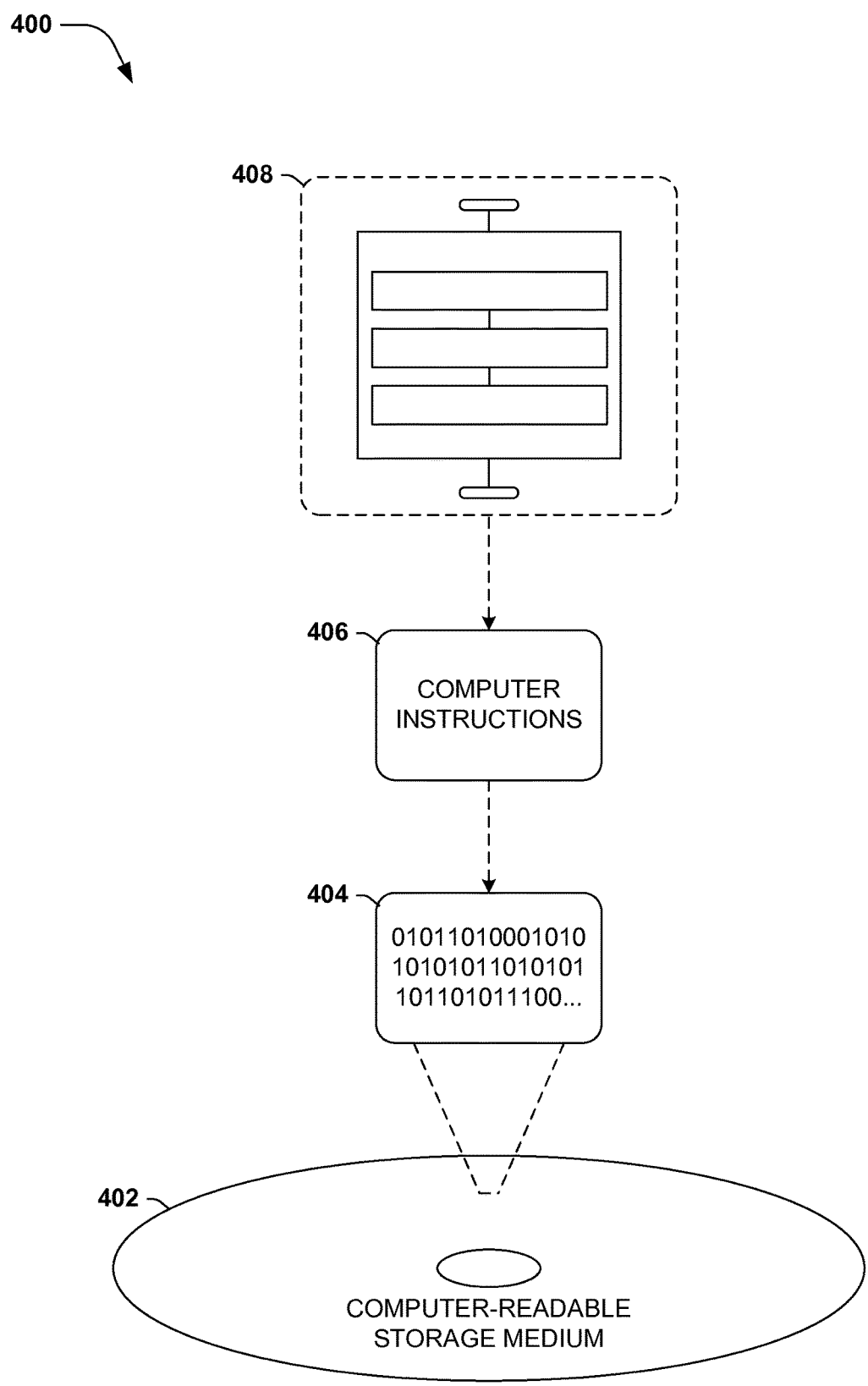
FIG. 4 is an illustration of an exemplary computer-readable storage medium storing instructions that, when executed on a processor of a device, cause the device to operate in accordance with the techniques presented herein.

An exemplary computer-readable medium that may be devised in these ways is illustrated in FIG. 4, wherein the implementation 400 comprises a computer-readable storage device 402 (e.g., a CD-R, DVD-R, or a platter of a hard disk drive), on which is encoded computer-readable data 404. This computer-readable data 404 in turn comprises a set of computer instructions 406 configured to operate according to the principles set forth herein. In one such embodiment, the processor-executable instructions 406 may be configured to perform a method of enabling an earpiece 202 to present media items 206 stored on a second device 114 during an interruption of a communication session with the second device 114, such as the exemplary method 300 of FIG. 3. Some embodiments of this computer-readable medium may comprise a computer-readable storage device (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary earpiece 202 of FIG. 2; the exemplary method 300 of FIG. 3; and the exemplary computer-readable storage device 400 of FIG. 4) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of earpieces 202 presenting many types of media items 206 from many types of second devices 114. For example, the earpieces 202 may comprise headsets for computers, televisions, or portable devices such as mobile phones, mobile media players, and mobile game devices; navigation devices for use with a vehicle; and the earpiece components of wearable headsets. Additionally, the earpiece 202 may communicate with the second device 114 in various ways, such as a persistent wired connection between the earpiece 202 and the second device 114 (e.g., a mobile phone work elsewhere on the body of the user 102); a transient wired connection between the earpiece 202 and the second device 114 (e.g., a connectable cable, such as a Universal Serial Bus (USB) cable); a directed wireless connection according to a wireless protocol; or a broadcast wireless connection, such as a radio frequency broadcast by the second device 114 to any nearby devices. Further, the connection between the earpiece 202 and the second device 114 may be comparatively persistent, or may be transient; e.g., the earpiece 202 and the second device 114 may interact and exchange data comprising audio output 126 while connected, such that the earpiece 202 may continue to present the audio output 126 of the second device 114 while disconnected.

As a second variation of this first aspect, an earpiece 202 configured as presented herein may be worn on an ear 106 of a user 102 in many ways, such as clipping to the helix of the outer ear; having an overlapping cover that fits over the antihelical fold of the outer ear; or attaching to the head 104 of the user 102 behind the ear 106. A portion of the earpiece 202 positioned near the ear canal 108 of the user 102 may be partially held in place and/or concealed by tragus of the ear 104. A portion of a housing of the earpiece 202 comprising the speaker 118 may enter the ear canal of the ear 106 of the user 102; may be positioned near the ear canal of the ear 106 of the user 102; and/or may be positioned within line of sight of the ear canal 108, while using focused audio techniques to direct audio output selectively toward the ear canal. It may be advantageous to design the housing of the earpiece 202 not to obstruct ambient sound arising within an environment of the user 102.

As a third variation of this first aspect, the earpiece 202 may interact with one ear 106 of the user 102, or with both ears 106 of the user 102 (e.g., the housing 200 may extend between the ears 106, and may include a speaker 118 for each ear 106). Alternatively, a first earpiece 202 worn on one ear 106 may connect through a wired or wireless connection with a second earpiece 202 worn on the other ear 106 of the user 102, and may interoperate with the second earpiece 202 to achieve the presentation of the audio output 126 from the device 122 to both ears 106 of the user 102. As one such example, where respective earpieces 202 further comprise a battery, a controller may selectively activate the speaker 118 of a first earpiece 202, and deactivate the speaker 118 of the second earpiece 202, in order to conserve battery power (e.g., alternating between the earpieces 202 throughout the day).

As a fourth variation of this first aspect, various actions involved in implementations of the techniques presented herein may be performed solely on the earpiece 202, solely on the second device 114, or with interoperation of these devices. For example, identifying 208 the media items 206 of the media item set of the second device 114 may be performed solely by the earpiece 202 (e.g., monitoring the media items 206 of predicted interest to the user 102, requesting and receiving the media items 206 from the second device 114, and storing the media items 206 in the cache 204), and/or by the second device 114 (e.g., monitoring the media items 206 played at the request of the user 102, and transmitting or "pushing" the selected media items 206 to the earpiece 202 for storage in the cache 204). Alternatively, the earpiece 202 and the second device 114 may interoperate to identify and select the media items 206 of predicted interest to the user 102 (e.g., a compilation and comparison of the requests by the user 102 to the earpiece 202 to play media items 206, and the request by the user 102 to the second device 114 to play media items 206). Many such variations and architectures may be devised in embodiments of the techniques presented herein.

D2. Selected Media Item Identification

A second aspect that may vary among embodiments of the techniques presented herein relates to the manner of identifying 304 media items 206 of predicted interest to the user 102 for transferring to the cache 204.

As a first variation of this second aspect, where at least one media item 206 comprises a media stream, the identification 208 may involve receiving from the user 102 a request to play the media stream through the earpiece 202 during the communication session with the second device 114 (e.g., playing an audio file that is stored on the second device 114). The currently playing media item 206 may then be transferred 210 to the cache 204 of the earpiece 202, such that the media stream may continue to be played from the cache 204 of the earpiece 202 during an interruption of the communication session with the second device 114.

As a second variation of this second aspect, the identification 208 may be performed by identifying favorite media items 206 of the user 102. For example, the second device 114 and/or earpiece 202 may monitor interactions of the user 102 with the media items 206 of the second device 104, and identify for transfer to the cache 204 the selected media items 206 having a highest access frequency among the media item set (e.g., the twenty most frequently played music tracks in the music library of the second device 114).

As a third variation of this second aspect, the identification 208 may be performed by identifying new media items 206 in the media item set of the second device 114. For example, the second device 114 and/or earpiece 202 may monitor interactions of the user 102 with the media items 206 of the second device 114 (optionally including those played from the cache 204 of the earpiece 202), and may identify for transfer to the cache 204 of the earpiece 202 selected media items 206 that have not yet been accessed by the user 102 (e.g., podcasts of a podcast collection that the user 102 has not yet heard).

As a fourth variation of this second aspect, the identification 208 may involve identifying media items 206 that are related to selected media items 206 that are stored in the cache 204. For example, if a first music track from an album is identified 208 and selected for transfer to the cache 204, the second device 114 and/or the earpiece 202 may automatically select other music tracks from the same album for transfer to the cache 204, particularly music tracks that sequentially follow the currently selected track (anticipating that the user 102 is more likely to advance through the album than to repeat previously played tracks).

As a fifth variation of this second aspect, the identification 208 may involve a various number of media items 206. As a first such example, the identification 208 may fill the capacity of the cache 204 with selected media items 206 of interest to the user 102. As a second such example, the identification may select a fixed and/or specified number of media items 206 (e.g., the user's twenty favorite music tracks). As a third such example, a predicted interruption period of the interruption of the communication session between the earpiece 202 and the second device 114 may be predicted (e.g., the average battery life of the earpiece 202, or the predicted duration of travel during which the earpiece 202 is not in communication with the second device 114, such as the predicted duration of an airplane flight), and the identification 208 may involves selecting media items 206 that together have a selected media item set duration that at least fills the predicted interruption period (e.g., at least two hours of music for a two-hour airplane flight).

As a sixth variation of this second aspect, the identification may involve detecting a reconnection of the earpiece 202 with the second device 114, and reloading the cache 204 of the earpiece 202 from the media items 206 of the second device 114 (e.g., automatically refreshing the cache 204 with new media items 206).

Figure 5:
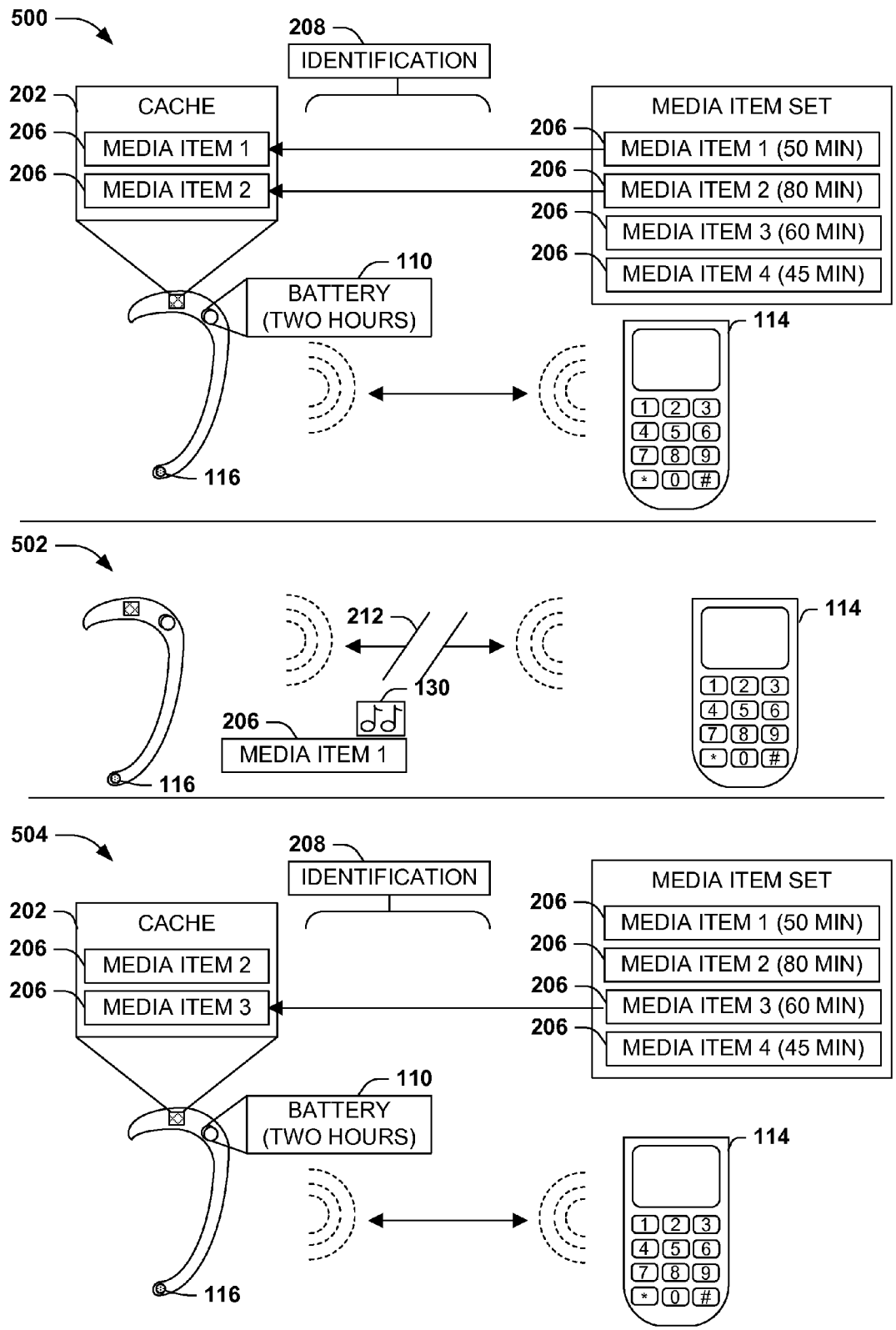
FIG. 5 is an illustration of an exemplary scenario featuring techniques for automatically identifying media items for delivery to a cache of an earpiece in accordance with the techniques presented herein.

FIG. 5 presents an illustration of an exemplary scenario featuring several such variations of this second aspect. At a first time point 500, while in communication with the second device 114, an earpiece 202 having a battery with a two-hour battery life may endeavor to fill its cache 202 with at least two hours of media items 206 from the media item set of the second device 114. Accordingly, the identification 208 may involve selecting the first two media items 206 that together comprise more than two hours of media playback. At a second time 502, during an interruption 212 of the communication session with the second device 114, the earpiece 202 may play the first media item 206 through the speaker 116 at the request of the user 102. At a third time 504, upon reconnecting with the second device 114, the earpiece 202 may automatically refresh the cache 202 with media items 206 from the media item set of the second device 114, e.g., by removing the first media item 206 that the user 102 has already heard, and adding a third media item 206 that the user 102 has not yet heard, where the second and third media items 206 again cover the battery life of the battery 110. In this manner, the earpiece 202 and/or second device 114 may automatically fill and manage the cache 202 of the earpiece 202 in accordance with the techniques presented herein.

D3. Playing Media Items

A third aspect that may vary among embodiments of these techniques involves the manner of presenting the media items 206 to the user 102.

As a first variation of this third aspect, the earpiece 202 may simply continue streaming media items 206 stored in the cache 204 during an interruption 212 of the communication session with the second device 114. For example, if the user 102 was listening to an audio stream of a media item 206 at the time of an interruption 212, the precaching of the media item 206 in the cache 204 of the earpiece 202 may enable the continued streaming of the media item 206 to the user 102, in the absence of any interaction by the user 102.

As a second variation of this third aspect, upon receiving from the user 102 a request to present a first selected media item 206 from the selected media items stored in the cache 204 of the earpiece 202, the earpiece 202 may present the first selected media item 206 to the user 102. Additionally, the earpiece 202 may permit various techniques for selecting for presentation to the user 102 the media items 206 stored in the cache 204. As a first such example, the earpiece 202 may receive one or more gestures associated with navigation among the media items 206 stored in the cache 204 (e.g., a request to present to the user 102 a second selected media item 206 in the cache, such as a next media item or a previous media item, or an associated media item that has an association with a currently or previously played media item 206). Accordingly, the earpiece 202 may navigate within the selected media item 206 stored in the cache 204 to present the second selected media item 204 to the user 104 through the speaker 126. As a second such example, respective selected media items may be associated with a keyword (e.g., respective music tracks, audiobooks, or podcasts may have a distinctive name), and the earpiece 202 may monitor a voice of the user 102, detect the keyword of a selected media item 206 within the voice of the user 102, and play the selected media item 206 for the user 102.

As a third variation of this third aspect, the earpiece 202 may permit the user 102 to specify a variety of commands to the earpiece 202 and/or the second device 114. In some embodiments, the earpiece 202 may forward to the second device 114 commands detected by the earpiece 202, but only while connected to the second device 114. For example, upon detecting in the voice of the user 102 a first keyword that is associated with a first command within an earpiece command set (e.g., the set of commands recognized and applied by the earpiece 202), the earpiece 202 may perform the first command. Upon detecting in the voice of the user 102 a second keyword associated with a second command within a second device command set (e.g., commands applicable to the second device 114), the earpiece 202 may determine whether the second device 114 is in communication with the earpiece 202. If the second command is received during the communication session with the second device 114, the earpiece 202 may transmit the second command to the second device 114 for execution; and upon determining that the second command is received during an interruption 212 of the communication session of the earpiece 202 with the second device 114, the earpiece 202 may present to the user 102 a disconnection cue through the earpiece 202 (e.g., an audio reminder that the second device 114 is not currently connected, and that the second command is unable to be currently fulfilled). In an embodiment, the earpiece 202 may, upon receiving a command for the second device 114 during the interruption 212, enqueue the command, and transmit the command to the second device 114 upon reconnection. Many such variations in the presentation of the media items 206 stored in the cache 204 of the earpiece 202 may be included in variations of the techniques presented herein.

D4. Environmental and Connectivity Adjustments

A fourth aspect that may vary among embodiments of the techniques presented herein relates to the adaptation of the earpiece 202 to the environment of the user 102.

As a first variation of this fourth aspect, an earpiece 202 may adapt the volume of the speaker 116 in response to the environment, and may adjust the volume level of the audio output of the speaker 116 proportionally with the volume of the ambient sound of the environment of the user 102 (e.g., automatically increasing the volume of the speaker 116 in noisy environments, and reducing the volume of the speaker 116 in quiet environments).

As a second variation of this fourth aspect, an earpiece 202 may select the volume of the speaker 116 in furtherance of the privacy of the user 102. For example, the earpiece 202 may selects a volume level of the audio output of the speaker 116 that is substantially inaudible outside of the ear canal of the user 102 to other individuals who may be present in the environment of the user 102.

As a third variation of this fourth aspect, an earpiece 202 may adapt to and notify the user 102 of varying connectivity of the earpiece 202 with the second device 114. For example, upon detecting an interruption of the wireless communication session with the second device, the earpiece transmits output to the user indicating the interruption of the wireless communication session. As a first example of this third variation, upon detecting an interruption of the communication session of the earpiece 202 with the second device 114, the earpiece 202 may present a disconnection cue to the user 102; and upon detecting a reconnection of the communication session of the earpiece 202 with the second device 114, the earpiece 202 may present a reconnection cue to the user 102. Further examples of this third variation involve mitigating the audial cues presented to the user 102 (e.g., if the user 102 is on the boundary of a connection/disconnection point between the earpiece 202 and the second device 114, it may be irritating to the user 102 to receive a rapid and continuous stream of audio cues of disconnection and reconnection). As a first such example, the earpiece 202 may detect an interruption of the communication session exceeding a first connection threshold, and may detecting the reconnection of the communication session exceeding a second connection threshold that is greater than the first connection threshold. In a second such example, the earpiece 202 may present the disconnection cue to the user 102 within a disconnection cue frequency threshold, and present presenting the reconnection cue to the user 102 within a reconnection cue frequency threshold. As a third such example, the earpiece 202 may, upon detecting, within a time block, a first interruption of the communication session with the second device 114, present to the user 102 a full disconnection cue; and upon detecting a second interruption of the communication session with the second device 114 within the time block following the first interruption, present to the user 102 only an abbreviated disconnection cue.

Figure 6:
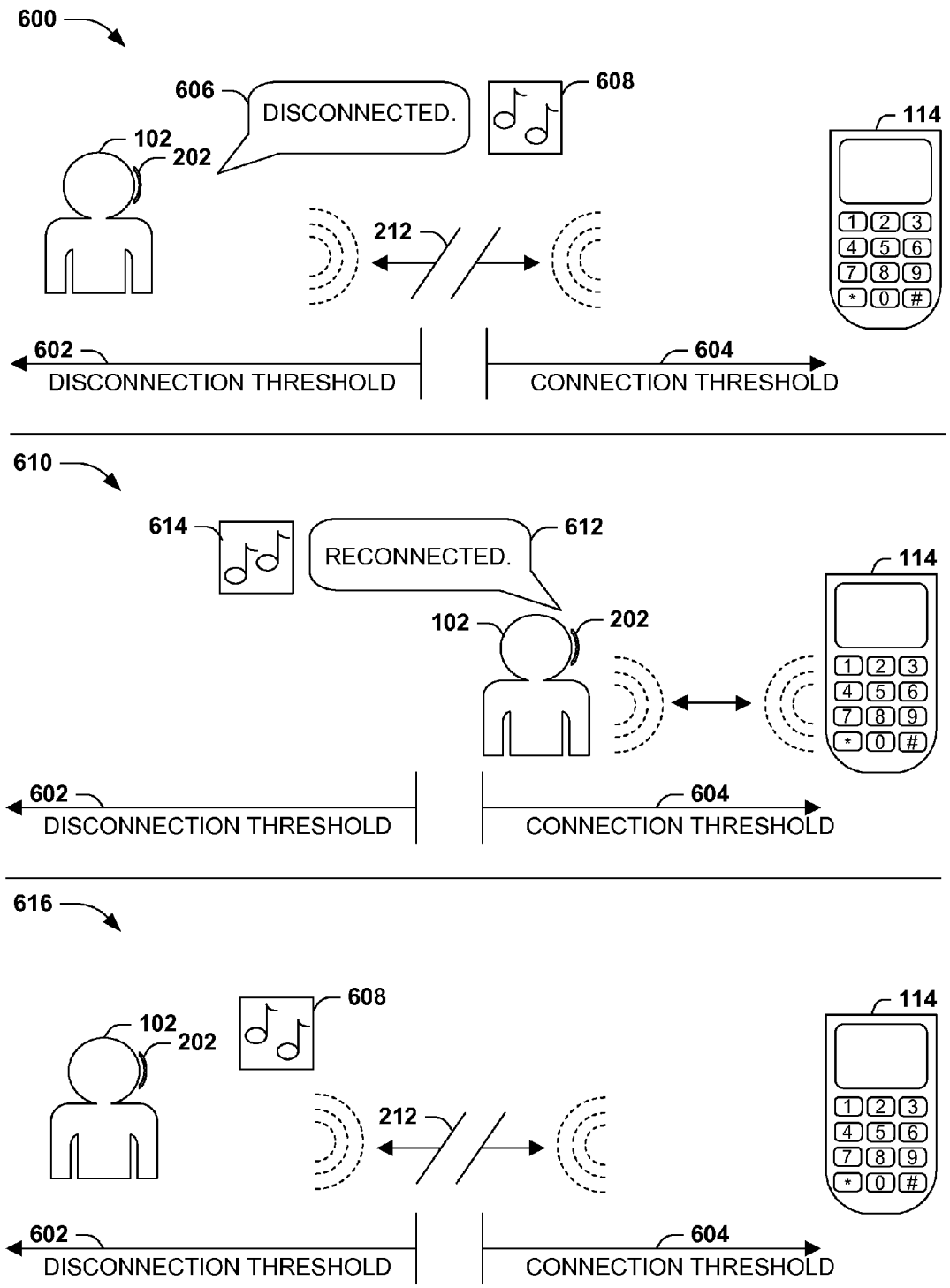
FIG. 6 is an illustration of an exemplary scenario featuring techniques for detecting and reporting disconnections and reconnections between an earpiece and a second device in accordance with the techniques presented herein.

FIG. 6 presents an illustration of an exemplary scenario featuring various techniques for notifying a user 102 of the connectivity of an earpiece 202 with the second device 114 in accordance with several such variations of this fourth aspect. In this exemplary scenario, the earpiece 202 may define a disconnection threshold 602 (e.g., a distance of more than fifty meters between the earpiece 202 and the second device 114, or less than two "bars" of connectivity), and also a connection threshold 604 (e.g., a distance of less than thirty meters between the earpiece 202 and the second device 114, or at least three "bars" of connectivity). The gap between the connection threshold 604 and the disconnection threshold 602 may reduce the incidence of a stream of audio cues "ping-ponging" rapidly between a connected and disconnected state. At a first time point 600, when the user 102 is beyond the disconnection threshold 602 causing an interruption 212 of the communication session, the earpiece 202 may present to the user 102 a full disconnection cue 606 (e.g., the spoken word "Disconnected"), and also an abbreviated audio cue 608 (e.g., a pair of falling musical notes). At a second time point 610, the user 102 may be within the connection threshold 604, and may play for the user 102 a full reconnection cue 612 and an abbreviated reconnection cue 614 (e.g., a pair of rising musical notes). At a third time point 616, the user 102 may again be within the disconnection threshold 602 within a time block (e.g., within an hour of the first time point 600), and the earpiece 202 may play for the user 102 only the abbreviated disconnection cue 608. In this manner, the earpiece 202 may notify the user 102 of the connection status of the earpiece 202 with the second device 114 in accordance with the techniques presented herein.

D5. Earpiece Applications

A fifth aspect that may vary among embodiments of the techniques presented herein relates to applications that may be executed on the earpiece 202 apart from the second device 114.

As a first variation of this fifth aspect, one or more gestures may be associated with invoking functionality on the earpiece 202 that is not directly associated with audio output generated by the second device 114. For example, an earpiece 202 may further comprise a processor, and at least one application respectively associated with an application gesture and executable on the processor. Upon detecting an application gesture by the user 102, the earpiece 202 may initiate the application associated with the application gesture on the processor. For example, the earpiece 202 may enable playing media stored in a memory of the earpiece 202, and/or a simple game involving audio output and controlled by an inertial head gesture of the user 102, such as an interactive story or a reaction-based game, and the gestures detected by the earpiece 202 may enable the selection and control of such applications on the earpiece 202.

As a second variation of this fifth aspect, the earpiece 202 may include a microphone that is capable of detecting a voice of the user 102. Upon receiving from the user 102 a request to record a voice note, the earpiece 202 may record the voice of the user 102 as the voice note and store the voice note in the cache 204 of the earpiece 202. Upon detecting a reconnection of the communication session of the earpiece 202 with the second device 114, the earpiece 202 may transfer the voice note to the second device 114. In some embodiments, it may be desirable defer an analysis of the voice recording to the second device 122, as such analysis may be computationally expensive in view of the limited computational resources of the earpiece 202, and/or may undesirably reduce the battery life of the earpiece 202. For example, upon receiving a voice command or voice recording from the user 102, the earpiece 202 may store a voice recording of the voice command in the cache 204, and may transfer the voice recording to the second device 122 for evaluation and execution as a voice command.

Figure 7:
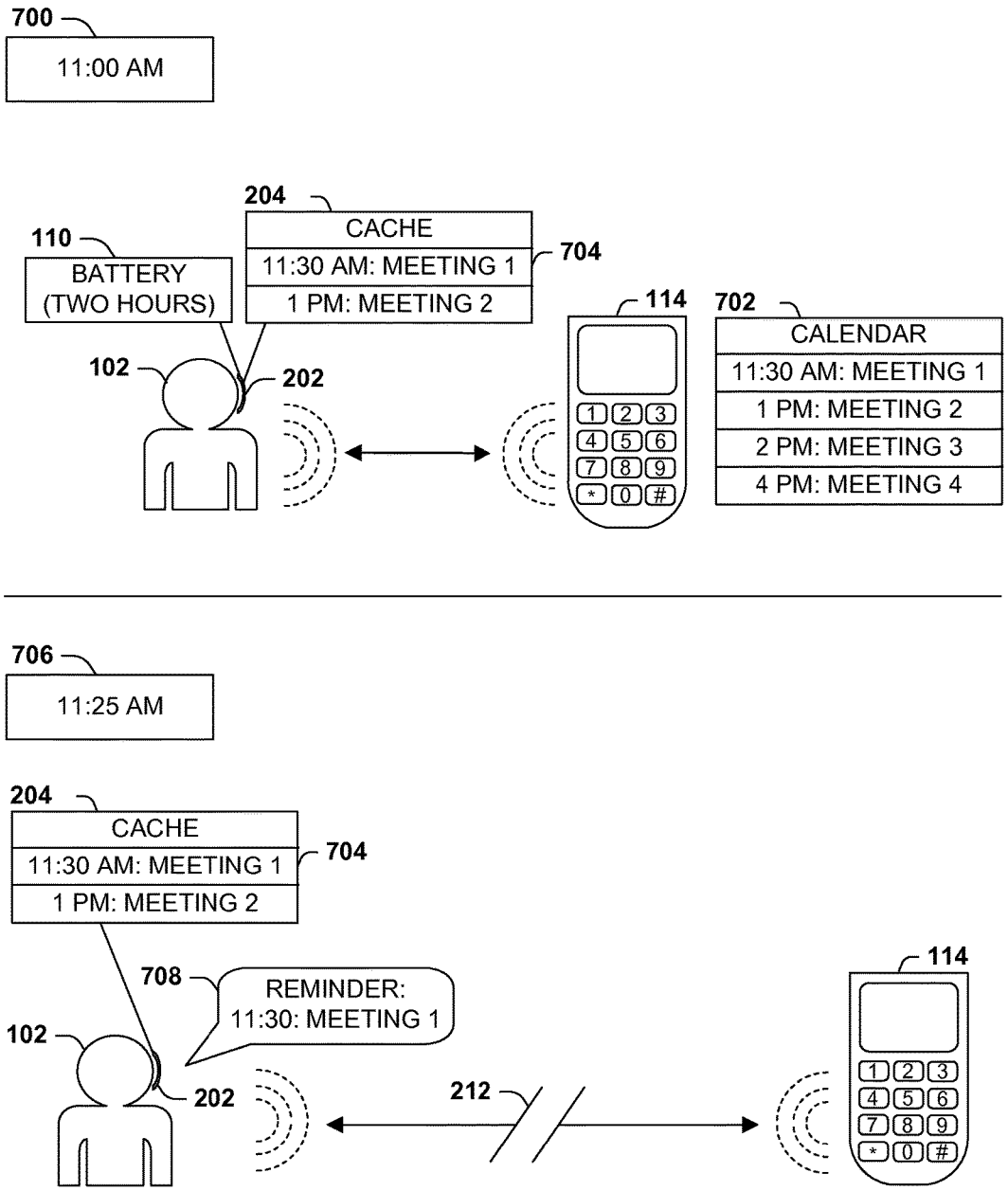
FIG. 7 is an illustration of an exemplary scenario featuring techniques for storing and presenting reminders of appointments on an earpiece in accordance with the techniques presented herein.

FIG. 7 presents an illustration of an exemplary scenario featuring a third variation of this fifth aspect. In this exemplary scenario, the second device 114 stores an appointment set (e.g., a calendar 702) comprising at least one appointment 704 of the user 102 at an appointment time. At a first time point 700, during a connection of the earpiece 202 and the second device 114, the earpiece 202 and/or second device 114 may, among the appointment set, identify at least one selected appointment arising within a time period of the first time 700 (e.g., the earpiece 202 and/or second device 114 may continuously select all appointments 704 within a designated period of a current time, such as two hours or one day), and transfer the selected appointments 704 from the appointment set to the cache 204 of the earpiece 202. At a second time 706, during an interruption 212 of the communication session between the second device 114 and the earpiece 202, the earpiece 202 may present to the user 102 an appointment reminder cue 708 that is no later than the appointment time of the appointment 704.

Figure 8:
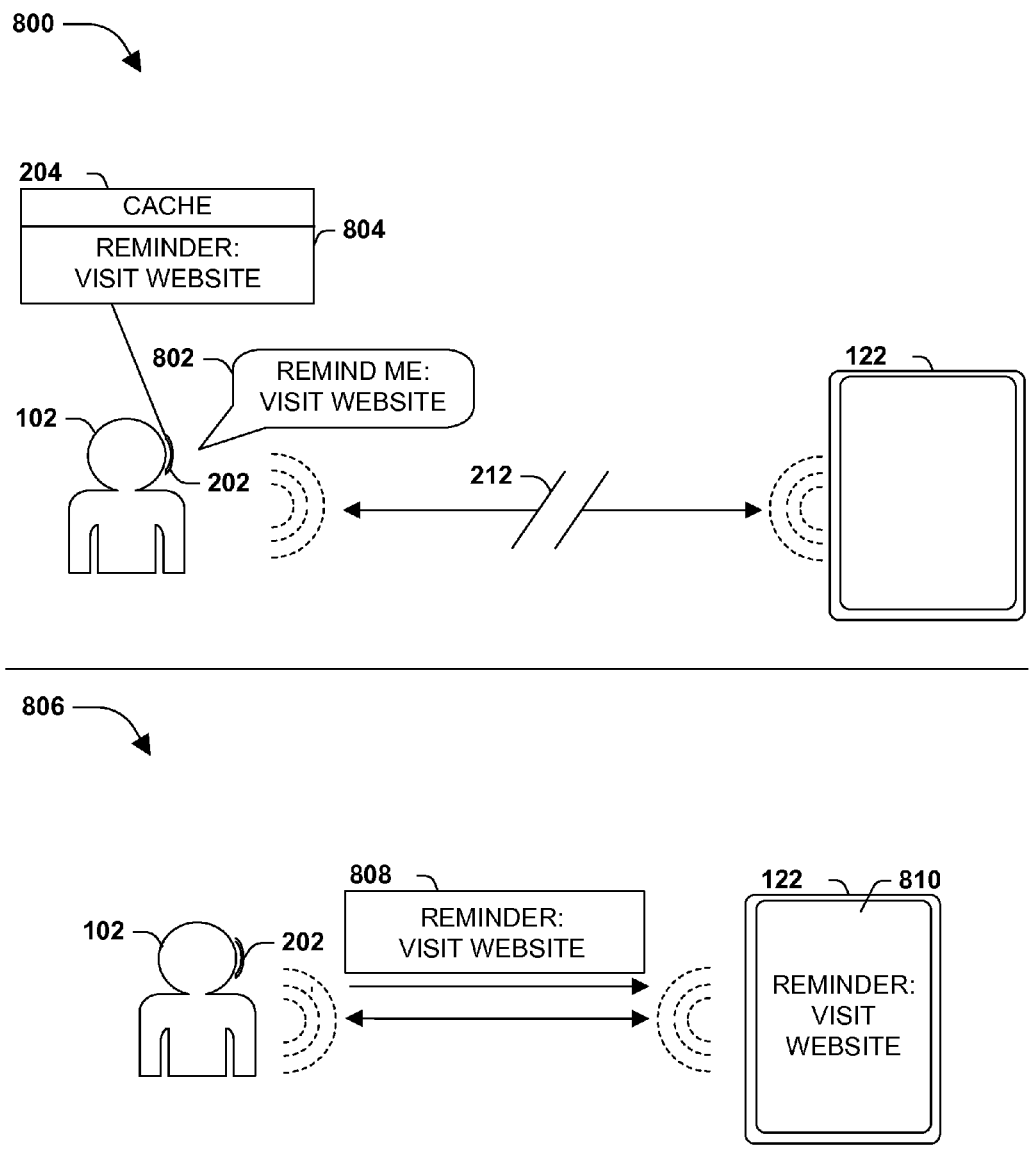
FIG. 8 is an illustration of an exemplary scenario featuring techniques for storing notes on an earpiece for presentation by a second device in accordance with the techniques presented herein.

FIG. 8 presents an illustration of an exemplary scenario featuring a fourth variation of this fifth aspect. In this exemplary scenario, at a first time 800, the earpiece 202 may receive from the user 202 a request 802 to store a reminder 804 to be presented for presentation upon reconnection of the communication session with the second device 122. Accordingly, the earpiece 202 may store in the cache 204 a reminder 804 corresponding to the request 802 of the user 102. At a second time 806, upon detecting a reconnection of the communication session with the second device 102, the earpiece 202 may transfer 808 the reminder 804 from the cache 204 to the second device 112 for presentation to the user 102. Accordingly, the second device 112 may be configured to, upon receiving the reminder 804 from the earpiece 202, present to the user 102 a notification 810 of the reminder 804. In this manner, the earpiece 202 and second device 122 may interoperate to achieve the execution of applications on the earpiece 202 in accordance with the techniques presented herein.

E. Computing Environment

Figure 9:
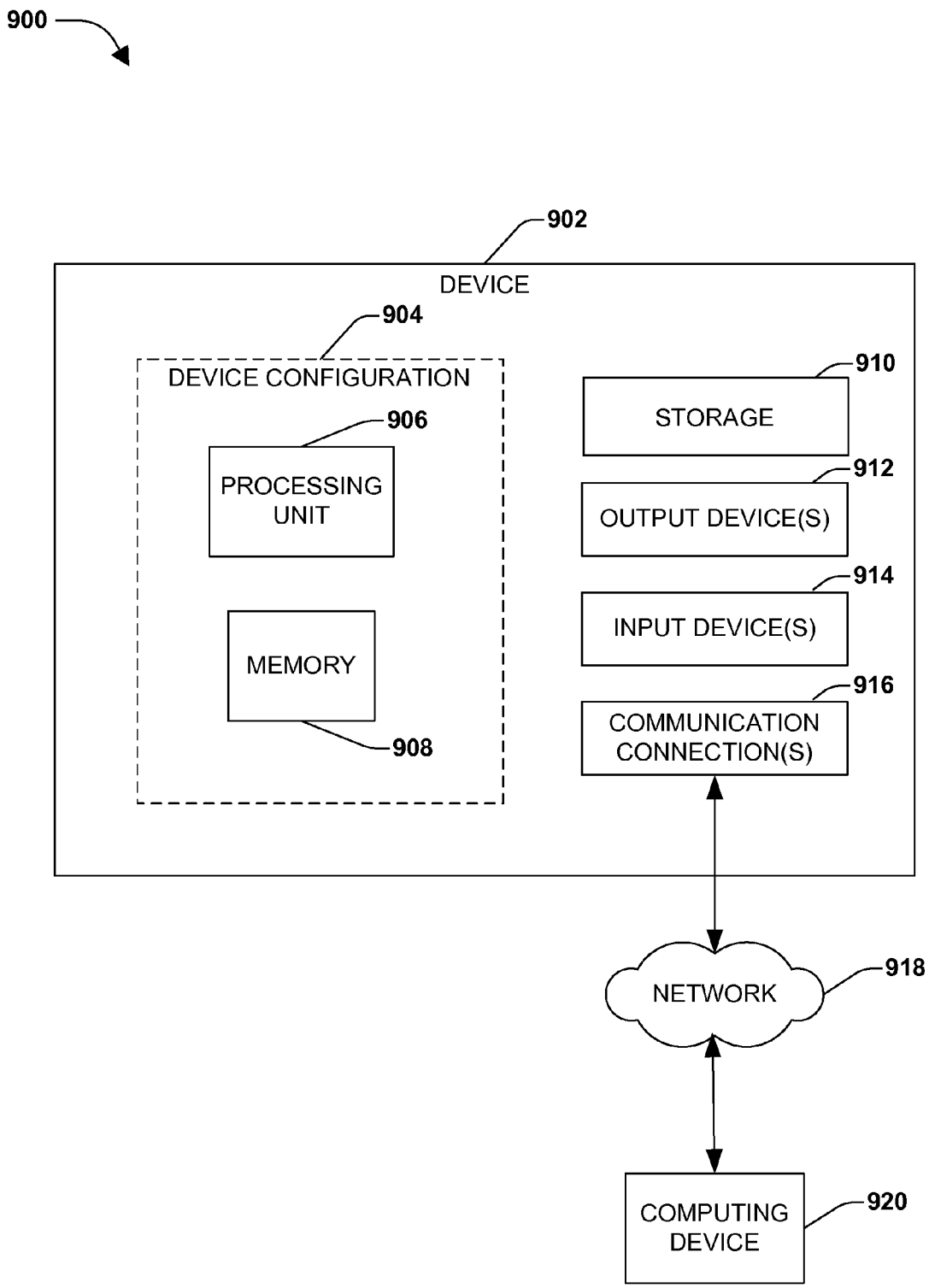
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer-readable storage devices. Such computer-readable storage devices may be volatile and/or non-volatile, removable and/or non-removable, and may involve various types of physical devices storing computer readable instructions or other data. Memory 908 and storage 910 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media.

The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of configuring an earpiece, worn by a user and having a communication session with a second device of the user, to manage a cache of the earpiece, the method comprising:

identifying, among at least two media items on the second device, at least one selected media item of predicted interest to the user;

transferring the at least one selected media item from the second device to the cache of the earpiece;

presenting to the user, through the earpiece, the at least one selected media item from the cache of the earpiece during an interruption of the communication session with the second device;

presenting the at least one selected media item to the user comprising:

upon receiving from the user a request to present a first selected media item from the selected media items stored in the cache of the earpiece, presenting the first selected media item to the user, respective selected media items being associated with a keyword, receiving the request from the user comprising:

monitoring a voice of the user; and detecting the keyword of a selected media item within the voice of the user, upon the earpiece detecting in the voice of the user a first keyword associated with a first command within an earpiece command set, performing the first command on the earpiece; and upon the earpiece detecting in the voice of the user a second keyword associated with a second command within a second device command set:

if the second command is received during the communication session of the earpiece with the second device, executing the second command on the second device; and if the second command is received during the interruption of the communication session of the earpiece with the second device, presenting to the user a disconnection cue through the earpiece.

2. The method of claim 1:

at least one selected media item comprising an audio stream;

identifying the selected media item comprising: receiving from the user a request to play the audio stream through the earpiece during the communication session with the second device; and presenting the selected media item to the user comprising: playing the audio stream from the cache of the earpiece during the interruption of the communication session with the second device.

3. The method of claim 1, identifying the selected media items comprising:

monitoring interactions of the user with the media items of the second device; and identifying the selected media items having a highest access frequency among the media item set.

4. The method of claim 1, identifying the selected media items comprising:

monitoring interactions of the user with the media items of the second device; and identifying the selected media items that have not yet been accessed by the user.

5. The method of claim 1, identifying the selected media items further comprising:

predicting a predicted interruption period of the interruption of the communication session between the earpiece and the second device; and identifying selected media items together having a selected media item set duration filling the predicted interruption period.

6. The method of claim 1, further comprising:

upon detecting an interruption of the communication session of the earpiece with the second device, present a disconnection cue to the user through the earpiece; and upon detecting a reconnection of the communication session of the earpiece with the second device, present a reconnection cue to the user through the earpiece.

7. The method of claim 6:

detecting the interruption of the communication session further comprising: detecting an interruption of the communication session exceeding a first connection threshold; and detecting the reconnection of the communication session further comprising: detecting the reconnection of the communication session exceeding a second connection threshold that is greater than the first connection threshold.

8. The method of claim 6:

presenting the disconnection cue to the user further comprising: presenting the disconnection cue to the user through the earpiece within a disconnection cue frequency threshold; and presenting the reconnection cue to the user further comprising: presenting the reconnection cue to the user through the earpiece within a reconnection cue frequency threshold.

9. The method of claim 6:

presenting the disconnection cue to the user further comprising:

upon detecting, within a time block, a first interruption of the communication session with the second device, present to the user a full disconnection cue through the earpiece; and upon detecting a second interruption of the communication session with the second device within the time block following the first interruption, present to the user an abbreviated disconnection cue through the earpiece.

10. A method of configuring an earpiece, worn by a user and having a communication session with a second device of the user, to manage a cache of the earpiece, the method comprising:

identifying, among at least two media items on the second device, at least one selected media item of predicted interest to the user;

transferring the at least one selected media item from the second device to the cache of the earpiece;

presenting to the user, through the earpiece, the at least one selected media item from the cache of the earpiece during an interruption of the communication session with the second device;

upon receiving from the user a reminder for presentation upon reconnection of the communication with the second device, storing the reminder; and upon detecting a reconnection of the communication session with the second device, presenting the reminder to the user.

11. The method of claim 10, further comprising: upon detecting a reconnection with the second device, reload the cache of the earpiece from the media items of the second device.

12. A method of configuring an earpiece, worn by a user and having a communication session with a second device of the user, to manage a cache of the earpiece, the method comprising:

identifying, among at least two media items on the second device, at least one selected media item of predicted interest to the user;

transferring the at least one selected media item from the second device to the cache of the earpiece; and presenting to the user, through the earpiece, the at least one selected media item from the cache of the earpiece during an interruption of the communication session with the second device, the second device storing an appointment set comprising at least one appointment of the user at an appointment time, among the appointment set, identifying at least one selected appointment arising within a time period of a current time;

transferring the at least one selected appointment from the appointment set to the cache of the earpiece; and presenting to the user through the earpiece an appointment reminder cue no later than the appointment time of the appointment.

13. The method of claim 12, further comprising: upon receiving from the user a request to present a second selected media item presented to the user, navigate within the selected media items stored in the cache to present the second selected media item to the user through the earpiece.

14. A computer-readable medium having contents configured to cause a computing system to perform a method of configuring an earpiece, worn by a user and having a communication session with a second device of the user, to manage a cache of the earpiece, the method comprising:

identifying, among at least two media items on the second device, at least one selected media item of predicted interest to the user;

transferring the at least one selected media item from the second device to the cache of the earpiece;

presenting to the user, through the earpiece, the at least one selected media item from the cache of the earpiece during an interruption of the communication session with the second device;

presenting the at least one selected media item to the user comprising:

upon receiving from the user a request to present a first selected media item from the selected media items stored in the cache of the earpiece, present the first selected media item to the user, respective selected media items being associated with a keyword, receiving the request from the user comprising:

monitoring a voice of the user; and detecting the keyword of a selected media item within the voice of the user, upon the earpiece detecting in the voice of the user a first keyword associated with a first command within an earpiece command set, perform the first command on the earpiece; and upon the earpiece detecting in the voice of the user a second keyword associated with a second command within a second device command set:

if the second command is received during the communication session of the earpiece with the second device, executing the second command on the second device; and if the second command is received during the interruption of the communication session of the earpiece with the second device, presenting to the user a disconnection cue through the earpiece.

15. An earpiece, suitable to be worn by a user and conduct a communication session with a second device of the user, the earpiece comprising:

a cache;

a speaker;

a microphone;

an earpiece manager configured to:

identify, among at least two media items on the second device, at least one selected media item of predicted interest to the user;

transfer the at least one selected media item from the second device to the cache of the earpiece;

present to the user, through the speaker, the at least one selected media item from the cache of the earpiece during an interruption of the communication session with the second device;

upon receiving from the user a reminder for presentation upon reconnection of the communication with the second device, store the reminder; and upon detecting a reconnection of the communication session with the second device, present the reminder to the user.

16. A computer-readable medium having contents configured to cause a computing system to perform a method of configuring an earpiece, worn by a user and having a communication session with a second device of the user, to manage a cache of the earpiece, the method comprising:

identifying, among at least two media items on the second device, at least one selected media item of predicted interest to the user;

transferring the at least one selected media item from the second device to the cache of the earpiece; and presenting to the user, through the earpiece, the at least one selected media item from the cache of the earpiece during an interruption of the communication session with the second device, the second device storing an appointment set comprising at least one appointment of the user at an appointment time, among the appointment set, identifying at least one selected appointment arising within a time period of a current time;

transferring the at least one selected appointment from the appointment set to the cache of the earpiece; and presenting to the user through the earpiece an appointment reminder cue no later than the appointment time of the appointment.

\* \* \* \* \*